United States Patent Office

3,410,653
Patented Nov. 12, 1968

3,410,653
ALKALI METAL SALT SEPARATION
Frank W. Theodore, Horseheads, N.Y., assignor to Corning Glass Works, Corning, N.Y., a corporation of New York
No Drawing. Filed Feb. 7, 1966, Ser. No. 525,383
7 Claims. (Cl. 23—63)

ABSTRACT OF THE DISCLOSURE

This invention relates to a method for separating a lithium salt from a fused mixture of alkali metal salts. The method comprises two principal steps: first, the fused salt mixture is recrystallized by precipitation thereof from a solution; and, second, the lithium salt is extracted from the recrystallized salt mixture by employing an organic liquid exhibiting a high differential solvent action for lithium salt.

---

A lithium silicate glass article may be chemically strengthened by exchanging a portion of the lithium ions in a surface zone on the article with a larger monovalent ion. This ion exchange develops a system of strengthening compressive stresses in the surface zone on the glass article providing the temperature is not too high. Any larger exchangeable ion may be used, but sodium and potassium are the ones commonly used. The sodium ion provides a particularly favorable mutual diffusion coefficient, but the potassium ion permits higher operating temperatures in subsequent use of the strengthened ware.

A molten salt bath is particularly effective as an ion exchange medium. However, the bath temperature must normally not exceed about 500° C. to avoid stress relaxation. It is, therefore, customary to employ a molten salt bath composed largely, if not entirely, of sodium or potassium nitrate.

During the ion exchange, the lithium ion from the glass enters the salt bath with the result that its concentration in that bath gradually increases as the bath is used. Experience has shown that, coincident with such increase in lithium ion concentration in the salt bath, the strengthening potential of the ion exchange process for a particular glass gradually decreases. Consequently, it is particularly desirable to provide a convenient method of effectively separating or removing at least a large portion of the lithium ion from the salt bath, either in the ion form or as a salt, with a minimum loss of primary salt.

Organic solvent extraction is a well-known technique in analytical chemistry for separating lithium from other alkali metals. Thus, organic liquids generally have a high differential solvent action for the lithium salt in such a salt mixture. In particular, an organic solvent may extract from 80 to 95% of the total lithium salt form a mixture containing up to 10% lithium salt, while dissolving a relatively minor amount of the primary salt. It was quite surprising then to find organic solvent extraction essentially ineffective with the fused salts taken from molten salt baths.

I have now found that the differential solubility of the lithium salt in organic solvents can be restored, provided the fused material is first recrystallized from solution. It appears that, on fusion, the salt mixture forms a solid solution from which the lithium salt is not readily extracted, and that such solid solution reverts to the separate salts on recrystallization. I have further found that the lithium salt removed by organic extraction can be recovered in the form of a carbonate by removing the organic solvent and precipitating the lithium from an aqueous solution as lithium carbonate.

Based on these and other findings, my invention is a method of separating a fused mixture of alkali metal salts containing a minor amount of a lithium salt component as a contaminant and a salt of at least one other alkali metal as a major component, the method comprising first recrystallizing the fused salt mixture from solution, treating the recrystallized salt with an organic liquid having a high preferential solubility for the lithium salt as compared to the major alkali metal salt component, and recovering the undissolved major alkali metal salt component from the organic solution of the lithium salt. The solvent may then be evaporated from the lithium salt and recovered, while the lithium salt may be precipitated from an aqueous solution by addition of sodium carbonate to form lithium carbonate.

The invention is further described, for purposes of illustration rather than limitation, with reference to recovery of sodium nitrate from a spent sodium nitrate salt bath used in chemical strengthening of lithium silicate glassware. The useful life of a sodium salt bath in chemical strengthening is a function of the lithium ion that migrates from the glass during the ion exchange process and accumulates in the salt bath. Under some circumstances, a bath can still be used until the lithium ion concentration reaches two or three percent. In other cases a bath may not be adequately effective after the lithium ion concentration reaches two- or three-tenths of a percent. In any event, it ultimately becomes necessary to either purify the salt bath or discard it, the latter obviously being a highly uneconomical expedient. For purification purposes, the molten salt may be gradually bled off from a bath and replaced, or the bath may be completely replaced in a batch-type technique, depending on the particular process and apparatus being used.

The molten salt is cooled, pulverized in a commercial grinder or mill, and dissolved in a solvent. In the usual practice, water is utilized as the solvent since it is the least expensive although the salt may be recrystallized out of other liquids such as ammonia, ethyl alcohol, methyl ethyl ketone, isopropyl alcohol, glycerin, acetone, etc., the only requirement for such a liquid being that the salt will dissolve fairly readily therein. When water is used as the solvent the aqueous solution is evaporated down to a predetermined concentration at which the salt readily crystallizes, e.g. a solution having a boiling point of 115° C. for $NaNO_3$, and allowed to cool to effect such crystallization. The water is filtered from the recrystallized salt and the damp salt removed for further treatment.

The recrystallized salt is now a physical mixture of the two component salts and is in suitable condition for solvent extraction. The salt mixture may be treated on the filter by passing a selected organic solvent through the filter to dissolve the lithium salt. Alternatively, the recrystallized salt mixture may be dumped in an agitator with a predetermined amount of organic liquid and agitated to dissolve the lithium salt. After thorough agitation, the organic solution of the lithium salt is separated from the undissolved sodium salt by filtration. The sodium salt thus recovered may then be dried for reuse in the salt bath treatment.

The filtrate, composed primarily of the organic solvent and lithium salt, may now be passed through a distillation column to remove the organic solvent for recovery by condensation. The concentrate of lithium salt may be converted into an aqueous solution and then treated with sodium carbonate. By double decomposition, lithium carbonate forms and is precipitated from solution. The lithium values may then be separated by filtration and salvaged for further use such as in the batch of the lithium glass employed initially in the chemical strengthening operation.

The particular organic solvent employed will depend somewhat on the form of the lithium salt. For example, the Kirk-Othmer "Encyclopedia of Chemical Technology" recommends amyl alcohol, a mixture of anhydrous ether and alcohol, primary butyl alcohol, or pyridine for the separation of lithium chloride from other alkali metal chlorides. In chemical strengthening practice, however, it is customary to use nitrate salt baths in order to provide a desired low melting temperature.

Accordingly, tests have been performed with a variety of comomn organic solvents to determine their relative efficiency in separating lithium and sodium nitrate salts. In these tests, a physical mixture of 99 parts $NaNO_3$ and one part $LiNO_3$ was prepared and treated with 400 parts of organic solvent by agitation for one hour. The solid salt remaining after such agitation was separated and analyzed for both sodium and lithium to test the efficiency of the separation.

The data thus obtained is set forth in the following table which shows, for each solvent, the percent recovery of $NaNO_3$ based on the original content of this salt, and the percent of $LiNO_3$ present in the recovered salt as residual contaminant.

| Solvent | $NaNO_3$ Recovery, percent | $LiNO_3$ Residue percent |
|---|---|---|
| Ethanol | 96.5 | 0.02 |
| Methanol | 91.0 | 0.01 |
| Acetic acid | 97.5 | 0.02 |
| Ethylene glycol | 48.0 | 0.02 |
| Methyl ethyl ketone | 99.0 | 0.12 |
| N-butyl acetate | 100.0 | 0.17 |
| Iso-propyl ether | 99.0 | 0.81 |

From the foregoing table it will be apparent that the simple aliphatic alcohols and acids are most effective for separation of the nitrate salts. However, in applications where a less complete separation is required, other organic liquid solvents may be suitable, or even preferable, because of convenience or cost.

By way of illustrating lithium recovery, a similar separation to that just described above, wherein the fused salt was recrystallized from water, was performed with ethyl alcohol on a mixture of 98% sodium nitrate and 2% lithium nitrate. The alcohol solution of lithium nitrate remaining at the conclusion of the process as described above was then passed into a commercial evaporator. This substantially removed the alcohol and left a liquid composed of about equal parts of water and lithium nitrate, the water having been carried through from the original recrystallization step.

This solution was then brought to a temperature of about 80° C., mixed with an amount of sodium carbonate equal to 125% of that calculated to react with the lithium nitrate, and the mixture agitated for a period of one hour. At this point, the material was filtered to remove the lithium carbonate precipitate and the amount of the latter determined. This determination indicated a recovery of about 80% of the original two parts of $LiNO_3$ in the original mixture.

Numeorus variations and modifications of the invention within the scope of the claims will be readily apparent from the foregoing illustrative description.

I claim:
1. A method for separating a fused mixture of alkali metal nitrates or chlorides containing a minor amount of a lithium nitrate or chloride component and, as a major component, a nitrate or chloride of at least one alkali metal selected from the group consisting of sodium and potassium comprising the steps:
   (a) dissolving said fused salt mixture in a solvent;
   (b) recrystallizing said salt mixture by evaporating said solvent to a predetermined concentration;
   (c) contacting said recrystallized salt mixture with an organic liquid solvent having a high preferential solubility for said lithium salt as compared to said major salt component; and
   (d) separating the undissolved major salt component from the organic solvent of said lithium salt.
2. A method according to claim 1 wherein the solvent in which the fused salt mixture is dissolved is water.
3. A method according to claim 2 wherein said fused mixture of alkali metal salts consists of $NaNO_3$ and $LiNO_3$.
4. A method according to claim 3 wherein the organic liquid solvent is a compound selected from the group consisting of simple aliphatic alcohols and simple aliphatic acids.
5. A method according to claim 4 wherein said simple aliphatic alcohols are selected from the group consisting of methanol and ethanol.
6. A method according to claim 4 wherein said simple aliphatic acid is acetic acid.
7. A method according to claim 4 wherein the solution of $LiNO_3$ in the organic liquid solvent is concentrated by evaporation to remove said solvent and $Na_2CO_3$ is added to the residual water solution to precipitate $Li_2CO_3$.

References Cited

UNITED STATES PATENTS

| | | | |
|---|---|---|---|
| 2,726,138 | 12/1955 | Cunningham | 23—31 |
| 2,816,007 | 12/1957 | Kroll | 23—31 X |
| 3,268,290 | 8/1966 | Gaska et al. | 23—89 |
| 3,278,260 | 10/1966 | Hermann | 23—27 X |
| 3,295,920 | 1/1967 | Goodenough et al. | 23—102 X |

OTHER REFERENCES

Comey et al.: "A Dictionary of Chemical Solubilities," MacMillan Co., New York, 1921, pp. 572, 586, 587 and 596.

OSCAR R. VERTZ, *Primary Examiner.*

G. T. OZAKI, *Assistant Examiner.*